(12) United States Patent
Hippert

(10) Patent No.: US 12,708,121 B2
(45) Date of Patent: Aug. 18, 2026

(54) MEAT-BASED FLOURS AND RELATED METHODS

(71) Applicant: JOJO'S JERKY INCORPORATED, Las Vegas, NV (US)

(72) Inventor: Hans Hippert, Las Vegas, NV (US)

(73) Assignee: JOJO'S JERKY INCORPORATED, Las Vegas, NV (US)

( * ) Notice: Subject to any disclaimer, the term of this patent is extended or adjusted under 35 U.S.C. 154(b) by 245 days.

(21) Appl. No.: 18/523,724

(22) Filed: Nov. 29, 2023

(65) Prior Publication Data

US 2025/0169512 A1 May 29, 2025

(51) Int. Cl.

| | |
|---|---|
| ***A21D 13/04*** | (2017.01) |
| ***A21D 2/34*** | (2006.01) |
| ***A21D 13/066*** | (2017.01) |
| ***A23B 4/03*** | (2006.01) |
| ***A23L 13/10*** | (2016.01) |
| ***A23L 13/50*** | (2016.01) |

(52) U.S. Cl.

CPC ............... *A21D 13/04* (2013.01); *A21D 2/34* (2013.01); *A21D 13/066* (2013.01); *A23B 4/03* (2013.01); *A23L 13/10* (2016.08); *A23L 13/52* (2016.08)

(58) Field of Classification Search

CPC ........... A21D 2/34; A21D 13/04; A23L 13/10; A23L 13/52

See application file for complete search history.

(56) References Cited

U.S. PATENT DOCUMENTS

| | | | | | |
|---|---|---|---|---|---|
| 91,176 | A * | 6/1869 | Stephens | A23L 19/15 426/473 |
| 658,248 | A * | 9/1900 | Dunn | C11B 1/10 426/454 |
| 678,283 | A * | 7/1901 | Schafer | A23B 7/144 426/320 |
| 1,005,539 | A * | 10/1911 | Grotkass et al. | C07C 7/20 554/20 |
| 1,372,527 | A * | 3/1921 | Maclachlan | A23L 13/10 159/4.01 |
| 1,517,445 | A * | 12/1924 | Maclachlan | A23L 13/10 34/313 |
| 1,536,308 | A * | 5/1925 | Remus | A23L 13/10 426/473 |

(Continued)

OTHER PUBLICATIONS

Memon, et al. "Impact of flour particle size on nutrient and phenolic acid composition of commercial wheat varieties". Journal of Food Composition and Analysis, 86 (2020). pp. 1-8. (Year: 2020).*

(Continued)

*Primary Examiner* — Jenna A Watts
(74) *Attorney, Agent, or Firm* — Holland & Hart LLP

(57) ABSTRACT

Various aspects of this disclosure relate to flours that comprise ground meat powder, which may be used as a flour substitute in baked goods. The flours generally comprise a water activity of less than 0.65 at room temperature and a minimal fat content such as less than 25 percent fat by mass, which synergistically inhibit the ground meat powder from clumping and cohering. The ground meat powders may be prepared, for example, by trimming fat from meat, cooking and dehydrating the meat, and then grinding the lean, dehydrated meat into a powder.

10 Claims, 14 Drawing Sheets

(56) References Cited

U.S. PATENT DOCUMENTS 3,922,372 A * 11/1975 Hasegawa ............... A23L 17/10 426/643
3,955,011 A * 5/1976 Niki ........................ A23L 17/10 426/643
3,959,517 A * 5/1976 Niki ........................ A23L 17/10 426/643
4,215,153 A * 7/1980 Kai ......................... A23L 17/10 426/643
5,059,445 A * 10/1991 Arsem .................... A23L 13/10 426/810

OTHER PUBLICATIONS

"Choosing the best source of protein: a case of the chicken or egg?". https://www.iqi-petfood.com/choosing-the-best-source-of-protein-a-case-of-the-chicken-or-the-egg/. Available online as of Apr. 28, 2022. pp. 1-6. (Year: 2022).*
Mediani, et al. "A comprehensive review of drying meat products and the associated effects and changes." Front Nutr. Nov. 28, 2022; 9:1057366. pp. 1-61. (Year: 2022).*

* cited by examiner

FIG. 5
CARNIVORE
CRISPS
CHICKEN BREAST
FLOUR
Protein Flour Made with Real Meat & Real Salt
Net Wt. 6 oz (170 g)

Carnivore Crisps
Grass Fed Beef Flour

INGREDIENTS:
GRASS FED BEEF,
REDMOND REAL SALT

WWW.CARNIVORECRISPS.COM
100% Product of USA
MANUFACTURED AND
DISTRIBUTED BY
JOJO'S JERKY, INC.
3310 S. JONES BLVD. SUITE F2
LAS VEGAS, NEVADA 89146

USE BY __________

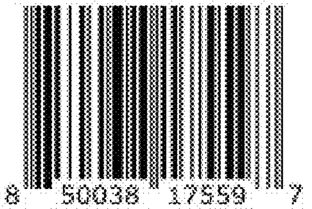

Nutrition Facts

8 servings per container
Serving size 0.75 oz (21g)

| **Amount Per Serving** | |
|---|---|
| **Calories** | **70** |
| | **% Daily Value*** |
| **Total Fat** 3.5g | **4%** |
| Saturated Fat 1.5g | **8%** |
| *Trans* Fat 0g | |
| **Cholesterol** 30mg | **10%** |
| **Sodium** 180mg | **8%** |
| **Total Carbohydrate** 0g | **0%** |
| Dietary Fiber 0g | **0%** |
| Total Sugars 0g | |
| Includes 0g Added Sugars | **0%** |
| **Protein** 9g | |
| Vitamin D 0mcg | 0% |
| Calcium 10mg | 0% |
| Iron 1.3mg | 8% |
| Potassium 140mg | 2% |

* The % Daily Value (DV) tells you how much a nutrient in a serving of food contributes to a daily diet. 2,000 calories a day is used for general nutrition advice.

Figure 8

Carnivore Crisps
Chicken Breast Flour

INGREDIENTS:
ANTIBIOTIC FREE CHICKEN BREAST, REDMOND REAL SALT

WWW.CARNIVORECRISPS.COM
100% Product of USA
MANUFACTURED AND DISTRIBUTED BY
JOJO'S JERKY, INC.
3310 S. JONES BLVD. SUITE F2
LAS VEGAS, NEVADA 89146

USE BY ___________

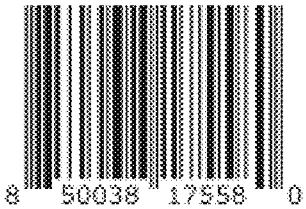

Nutrition Facts

8 servings per container
Serving size 0.75 oz (21g)

Amount Per Serving
Calories 70

| | **% Daily Value*** |
|---|---|
| **Total Fat** 1.5g | **2%** |
| Saturated Fat 0g | **0%** |
| *Trans* Fat 0g | |
| **Cholesterol** 40mg | **13%** |
| **Sodium** 180mg | **8%** |
| **Total Carbohydrate** 0g | **0%** |
| Dietary Fiber 0g | **0%** |
| Total Sugars 0g | |
| Includes 0g Added Sugars | **0%** |
| **Protein** 12g | |
| Vitamin D 0mcg | 0% |
| Calcium 0mg | 0% |
| Iron 0.7mg | 4% |
| Potassium 180mg | 4% |

* The % Daily Value (DV) tells you how much a nutrient in a serving of food contributes to a daily diet. 2,000 calories a day is used for general nutrition advice.

Figure 9

Carnivore Crisps Beef & Organ Blend Flour

INGREDIENTS:
GRASS FED BEEF, GRASS FED BEEF HEART, GRASS FED BEEF LIVER, GRASS FED BEEF KIDNEY, REDMOND REAL SALT

WWW.CARNIVORECRISPS.COM
100% Product of USA
MANUFACTURED AND DISTRIBUTED BY
JOJO'S JERKY, INC.
3310 S. JONES BLVD. SUITE F2
LAS VEGAS, NEVADA 89146

USE BY ___________

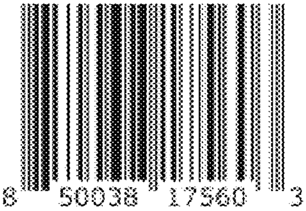

Nutrition Facts 8 servings per container
Serving size 0.75 oz (21g)

Amount Per Serving
Calories 80

| | **% Daily Value*** |
|---|---|
| **Total Fat** 4g | **5%** |
| Saturated Fat 1.5g | **8%** |
| *Trans* Fat 0g | |
| **Cholesterol** 75mg | **25%** |
| **Sodium** 160mg | **7%** |
| **Total Carbohydrate** 0g | **0%** |
| Dietary Fiber 0g | **0%** |
| Total Sugars 0g | |
| Includes 0g Added Sugars | **0%** |
| **Protein** 9g | |
| Vitamin D 0.2mcg | 0% |
| Calcium 10mg | 0% |
| Iron 1.9mg | 10% |
| Potassium 140mg | 2% |

* The % Daily Value (DV) tells you how much a nutrient in a serving of food contributes to a daily diet. 2,000 calories a day is used for general nutrition advice.

Figure 10

FIG. 13
CARNIVORE
CRISPS
GRASS FED BEEF
FLOUR
Net Wt. 5.25 OZ (149 g
CARNIVORE
CRISPS
CHICKEN BREAST
FLOUR
Net Wt. 5.25 OZ (147 g)

MEAT-BASED FLOURS AND RELATED METHODS

FIELD OF TECHNOLOGY

This disclosure relates to flours for use in baked goods generally and high-protein, low-carbohydrate flours specifically including flours derived from novel sources that are suitable for use in baked goods such as by replacing a conventional flour with an inventive flour of this disclosure during the preparation of a baked good. The disclosure also relates to the manufacture and use of novel flours.

BACKGROUND

Flour is a food ingredient that was historically milled from grains such as corn and wheat. Many food products include flour as their primary ingredient including breads, tortillas, and pastas. The United States produces over 20 million tons of wheat flour every year, and the average American consumes over 130 pounds of wheat flour annually. The global market for wheat flour is much larger and exceeds $240 billion in annual sales with the European Union, China, India, and Russia combining to produce about 10 times more wheat than the United States.

Wheat nevertheless contains gluten, which can produce debilitating immune responses in persons with either celiac disease or non-celiac gluten sensitivities. Celiac disease affects about 1-2 percent of the population, and non-celiac gluten sensitivities affect about 6-10 percent of the population. Novel flours that allow the preparation of gluten-free baked goods are desirable.

Conventional flours also generally contain relatively large amounts of carbohydrates, which are generally incompatible with ketogenic diets and paleolithic diets. Novel flours that allow the preparation of low-carbohydrate baked goods are desirable particularly when such flours are compatible with ketogenic, paleolithic, carnivore, and other low-carbohydrate diets.

SUMMARY

Various aspects of this disclosure relate to flours produced from meats. Such flours contain high protein contents and high concentrations of essential nutrients relative to both conventional flours and conventional meat products. The flours also generally lack gluten and contain negligible carbohydrates. They can therefore be used to produce baked goods that present favorable nutritional profiles and that are compatible with gluten-free, ketogenic, carnivore, and paleolithic diets.

The flours of this disclosure are generally produced by trimming fat from meat, cooking and dehydrating the meat in a dehydrator, and then grinding the lean, dehydrated meat into a powder. Removing fat from the meat and dehydrating the meat synergistically allow for stable powders that reduce clumping and cohesion into accretion products that lack suitability as an ingredient.

The flours of this disclosure are generally compatible as substitutes for conventional flours in baked goods. Other high-protein, low-carbohydrate powders are known and include protein isolates, but these species of prior art powders generally lack suitability for use in baked goods, for example, because they lack physical and chemical properties to support the structure and texture of a baked good. Other dehydrated meat products are known and include lyophilized meat products, for example, which are used as ingredients in the commercial manufacture of pet food. The stability of prior art meat products as powders and the suitability of prior art meat products as flour substitutes are unknown. The compatibility of ground meat powders as substitutes for conventional flours in baked goods was similarly unknown.

Illustrative flours of this disclosure comprise beef powder, which optionally includes beef heart, beef kidney, and beef liver powders, or chicken powder. The source of the meat is not limiting, and other common meats including fish, poultry, rabbit, pork, mutton, chevon, venison, and veal are suitable for the manufacture of flours according to this disclosure.

The foregoing Summary, Background, and Field of the Technology sections provide a brief overview of relevant problems confronted by innovators who develop new flours for use in baked goods as well as a brief overview of the novel methods and compositions of this disclosure; the foregoing sections shall not limit the Detailed Description that follows or any patent claim that matures from this disclosure; any patent claim that matures from this disclosure shall instead be construed according to the plain meaning of the patent claim as interpreted by one of ordinary skill in the relevant arts in the context of the claim dependency of the patent claim and any amendments made to the patent claim during prosecution of the patent application from which the patent claim matures.

BRIEF DESCRIPTION OF THE DRAWINGS

The following figures are provided as examples that fall within the scope of this disclosure, and the figures shall not be construed as limiting this disclosure or any patent claim that matures from this disclosure.

FIG. 8 is a nutrition label for a ground beef powder.

FIG. 9 is a nutrition label for a ground chicken powder.

FIG. 10 is a nutrition label for a ground beef powder that includes beef heart, beef kidney, and beef liver.

DETAILED DESCRIPTION

Figure 1:
FIG. 1 is an image of a flour that comprises ground beef powder as well as product packaging for the flour.
Figure 2:
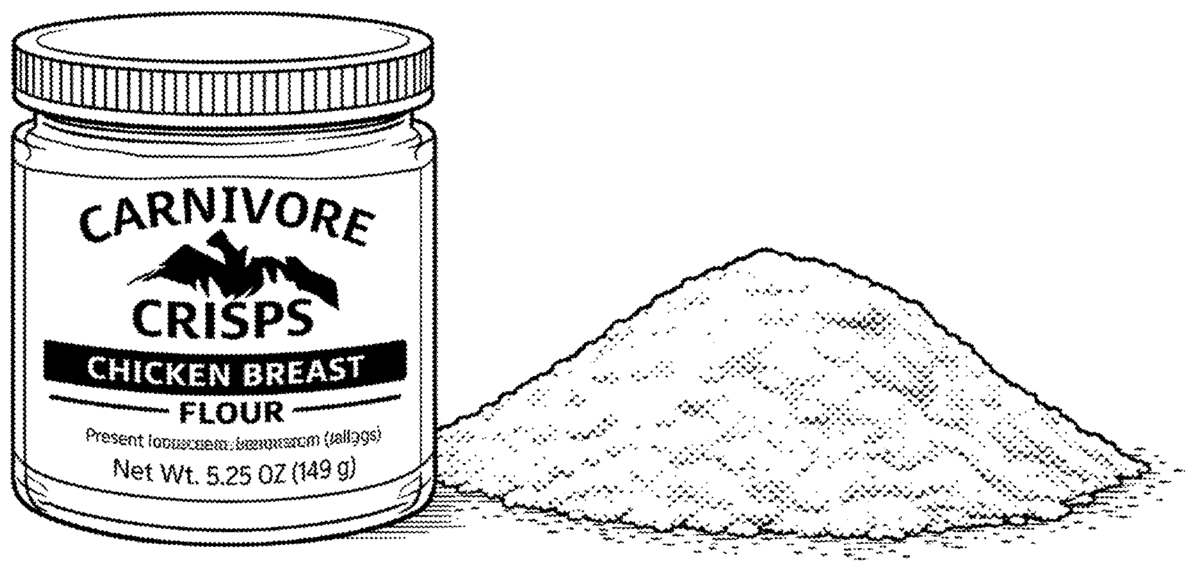
FIG. 2 is an image of a flour that comprises ground chicken powder as well as product packaging for the flour.
Figure 3:
FIG. 3 is an image of a flour that comprises ground beef powder that includes beef heart, beef kidney, and beef liver as well as product packaging for the flour.
Figure 4:
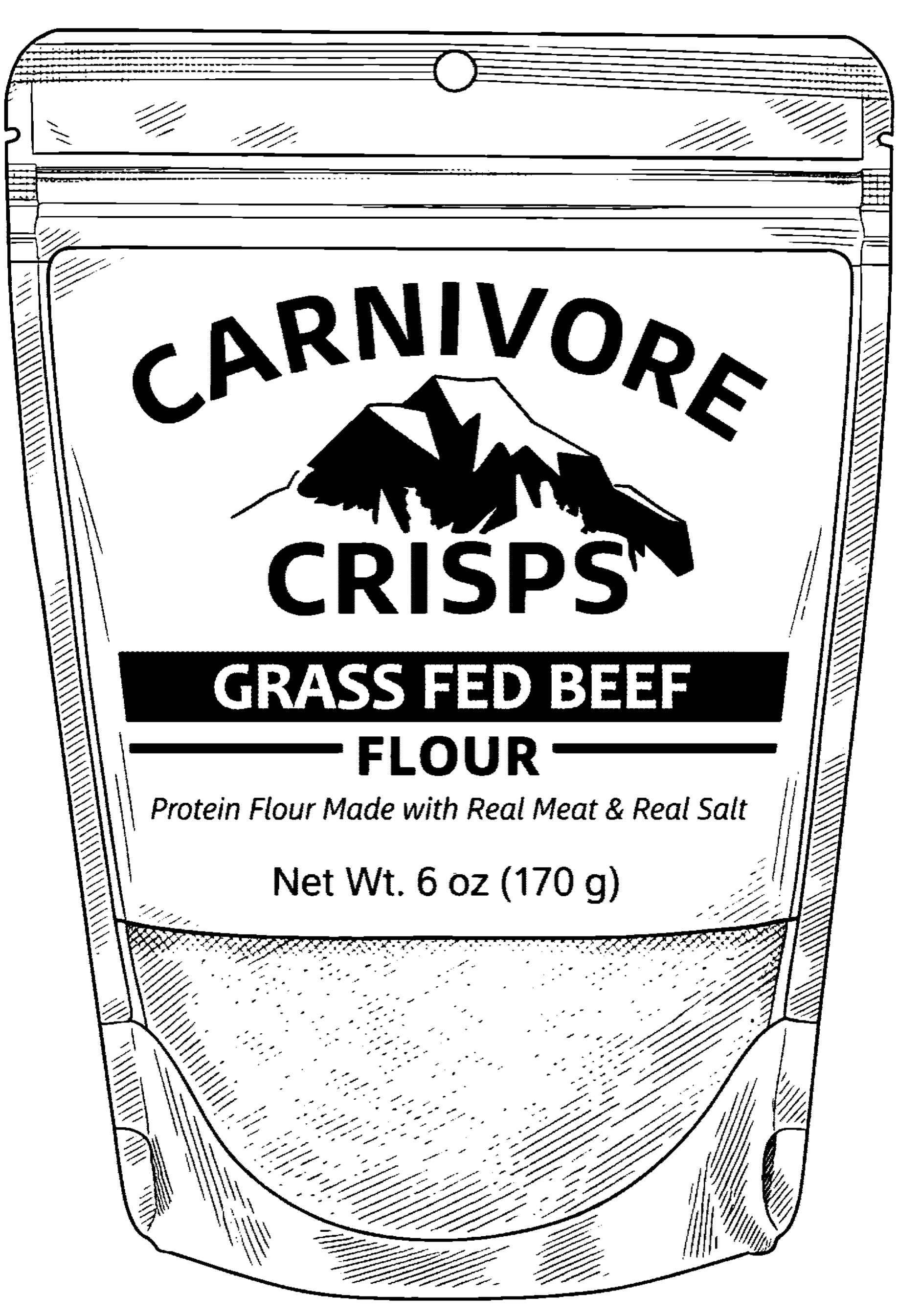
FIG. 4 is an image of product packaging for a flour that comprises ground beef powder.
Figure 5:
FIG. 5 is an image of product packaging for a flour that comprises ground chicken powder.
Figure 6:
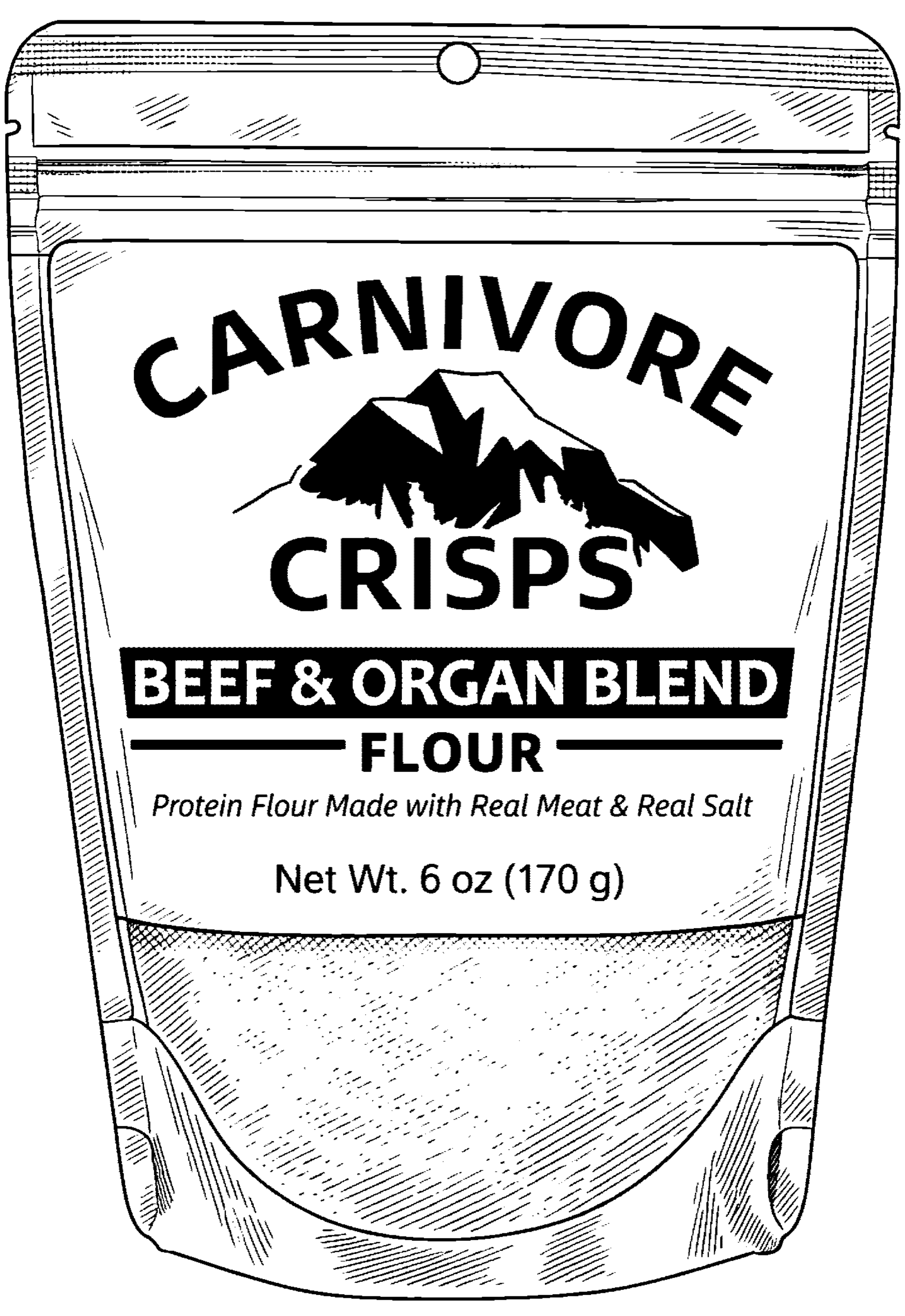
FIG. 6 is an image of product packaging for a flour that comprises ground beef powder that includes beef heart, beef kidney, and beef liver.

Various aspects of this disclosure relate to a flour that is a dry, solid powder. In all examples, the flour comprises a ground meat powder. Illustrative flours of this disclosure are depicted in FIGS. 1-3.

Flours that comprise ground meat powder are challenging to manufacture and stabilize because ground meat tends to clump and cohere. The ground meat powders of this disclosure are stabilized, for example, by depleting fat and water, which synergistically inhibits clumping and coherence. In some examples, for example, the flour has a fat concentration that does not exceed 25 percent by mass and a water activity that does not exceed 0.65 at 70 degrees Fahrenheit (21 degrees Celsius).

The term "meat" refers to both flesh and organ meat such as flesh and organ meat that has been processed according to methods of this disclosure such as by trimming fat from the meat and such as by dehydrating the meat. "Meat" is derived from an animal, and the term "meat" does not refer to any laboratory-grown meat or meat alternatives such as Beyond Meat® or Impossible™ meat. The term "meat" does not refer to protein isolates derived from meat or any other product that is either purified from meat or chemically derived from meat.

The term "ground" refers to a grinding process by which a meat powder is manufactured, which includes physical processes such as grinding in a blender and excludes other manufacturing processes, for example, which change the chemical composition of the meat such as by purifying a component of the meat.

The grind size of a ground meat powder is typically in the range of 10 microns to 1,000 microns although a portion of the ground meat powder may be ground to less than 10 microns and another portion of the ground meat powder may be ground to greater than 1,000 microns. In some examples, at least 50 percent of the powder by mass has a particle size of at least 75 microns and up to 850 microns. In some specific examples, at least 60 percent of the powder by mass has a particle size of at least 75 microns and up to 850 microns. In some specific examples, at least 70 percent of the powder by mass has a particle size of at least 75 microns and up to 850 microns.

In some examples, at least 50 percent of the powder by mass has a particle size of at least 75 microns and up to 850 microns following one month of storage in a hermetically-sealed container at 70 degrees Fahrenheit (21 degrees Celsius). In some specific examples, at least 60 percent of the powder by mass has a particle size of at least 75 microns and up to 850 microns following one month of storage in a hermetically-sealed container at 70 degrees Fahrenheit (21 degrees Celsius). In some specific examples, at least 70 percent of the powder by mass has a particle size of at least 75 microns and up to 850 microns following one month of storage in a hermetically-sealed container at 70 degrees Fahrenheit (21 degrees Celsius).

The surface-area-to-volume ratio of the powder presents another parameter. The surface-area-to-volume ratio must be great enough, for example, to bind the powder to other ingredients. Greater surface-area-to-volume ratios also improve the absorption of nutrients during the digestion of foods containing meat powders. Greater surface-area-to-volume ratios also favor binding of the powder to itself, however, which limits the optimal surface-area-to-volume ratio to a relatively narrow operable window. Greater surface-area-to-volume ratios also affect the rates at which volatile molecules such as water evaporate from and condense onto the powder, which affects shelf-life; surface-area-to-volume ratio inversely correlates with shelf life.

In some examples, the powder has a surface-area-to-volume ratio of at least 750 per meter. In some specific examples, the powder has a surface-area-to-volume ratio of at least 800 per meter and up to 110,000 per meter. In some specific examples, the powder has a surface-area-to-volume ratio of at least 1,500 per meter and up to 75,000 per meter.

In some examples, the powder has a surface-area-to-volume ratio of at least 750 per meter following one month of storage in a hermetically-sealed container at 70 degrees Fahrenheit (21 degrees Celsius). In some specific examples, the powder has a surface-area-to-volume ratio of at least 800 per meter and up to 110,000 per meter following one month of storage in a hermetically-sealed container at 70 degrees Fahrenheit (21 degrees Celsius). In some specific examples, the powder has a surface-area-to-volume ratio of at least 1,500 per meter and up to 75,000 per meter following one month of storage in a hermetically-sealed container at 70 degrees Fahrenheit (21 degrees Celsius).

The flours of this disclosure optionally comprise one or more additional ingredients, which may be added, for example, to one or more of increase the shelf life of a flour, inhibit clumping of a flour, inhibit self-cohesion of a flour, improve flowability of the flour, modulate the flavor of the flour, and modulate physical and/or chemical properties of the flour such as binding of a flour to other ingredients. Additional ingredients may include, for example, sodium chloride.

In some examples, the flour comprises the ground meat powder at a concentration of at least 50 percent by mass. In some specific examples, the flour comprises the ground meat powder at a concentration of at least 70 percent by mass. In some specific examples, the flour comprises the ground meat powder at a concentration of at least 90 percent by mass.

The flours of this disclosure generally have novel nutritional profiles, which may be evident, for example, by reviewing a Nutrition Facts label (United States & Canada) or a Nutrition Declaration (Europe). The flours of this disclosure typically comprise fat at a concentration of at least 1 percent and up to 25 percent by mass and protein at a concentration of at least 30 percent and up to 95 percent by mass. The flours of this disclosure generally either lack carbohydrates or comprise carbohydrates at a concentration of up to 2 percent by mass. The flours of this disclosure generally comprise at least 2 and up to 6 food calories per gram.

In this disclosure, the term "food calorie" refers to a North American Calorie, which is equivalent to a European kilocalorie. In some specific examples, a flour of this disclosure comprises at least 2.5 and up to 5.5 food calories per gram. In some specific examples, a flour comprises at least 3.0 and up to 4.5 food calories per gram.

Generic flours of this disclosure are generally dry, solid powders that comprise a ground meat powder at a concentration of at least 70 percent by mass, wherein at least 50 percent of the powder by mass has a particle size of at least 10 microns and up to 1,000 microns; that comprise fat at a concentration of at least 1 percent and up to 25 percent by mass; that comprise protein at a concentration of at least 30 percent and up to 95 percent by mass; that comprise at least 2 and up to 6 food calories per gram; that have a water activity of up to 0.6 at 70 degrees Fahrenheit (21 degrees Celsius); and wherein the powder has a surface-area-to-volume ratio of at least 800 per meter and up to 110,000 per meter. In some specific examples, the flour comprises a ground meat powder at a concentration of at least 70 percent by mass, wherein at least 50 percent of the powder by mass has a particle size of at least 75 microns and up to 850 microns; the flour comprises fat at a concentration of at least 1 percent and up to 25 percent by mass; the flour comprises protein at a concentration of at least 30 percent and up to 95 percent by mass; the flour comprises at least 2 and up to 6 food calories per gram; the flour comprises potassium at a concentration of at least 0.5 percent and up to 2.5 percent by mass; the flour comprises phosphorous at a concentration of at least 0.6 percent and up to 1.2 percent by mass; the flour has a water activity of at least 0.35 and up to 0.6 at 70 degrees Fahrenheit (21 degrees Celsius); and the powder has a surface-area-to-volume ratio of at least 800 per meter and up to 110,000 per meter.

The terms calcium, potassium, sodium, magnesium, copper, iron, and zinc generally refer to oxidized, cationic forms, for example Ca++, K+, Na+, Mg++, Cu(I), Cu(II), Fe(II), Fe(III), and Zn(II), although iron might also be present as a metal.

The term phosphorous refers to phosphorous present in a composition in any form, which includes phosphorous present in phosphate, phosphorylated compounds, and nucleic acids.

In some examples, the flour comprises one or more ground meat powders at a concentration of at least 80 percent by mass. In some specific examples, the flour comprises one or more ground meat powders at a concentration of at least 90 percent by mass. In some specific examples, the flour comprises one or more ground meat powders at a concentration of at least 95 percent by mass.

In some examples, the flour comprises fat at a concentration of up to 25 percent by mass. In some specific examples, the flour comprises fat at a concentration of up to 20 percent by mass. In some specific examples, the flour comprises fat at a concentration of at least 5 percent and up to 20 percent by mass.

In some examples, the flour comprises protein at a concentration of at least 30 percent and up to 95 percent by mass. In some specific examples, the flour comprises protein at a concentration of at least 30 percent and up to 65 percent by mass. In some specific examples, the flour comprises protein at a concentration of at least 30 percent and up to 60 percent by mass. In some specific examples, the flour comprises protein at a concentration of at least 35 percent and up to 65 percent by mass.

In some examples, the flour comprises carbohydrates at a concentration of up to 2 percent by mass. In some specific examples, the flour lacks carbohydrates at a concentration greater than 2 percent by mass.

In some examples, the ground meat powder consists of one or more of fish, chicken, poultry, rabbit, pork, mutton, chevon, venison, veal, and beef. In some specific examples, the ground meat powder consists of beef or chicken.

In some examples, the ground meat powder consists of beef; the flour comprises fat at a concentration of at least 5 percent and up to 25 percent by mass; the flour comprises protein at a concentration of at least 30 percent and up to 60 percent by mass; the flour comprises at least 2 and up to 6 food calories per gram; and the flour comprises cholesterol at a concentration of up to 0.5 percent by mass. In some specific examples, the ground meat powder consists of beef; the flour comprises fat at a concentration of at least 5 percent and up to 25 percent by mass; the flour comprises saturated fat at a concentration of at least 1 percent and up to 3 percent by mass; the flour comprises protein at a concentration of at least 30 percent and up to 60 percent by mass; the flour comprises at least 2.5 and up to 5.5 food calories per gram; the flour comprises potassium at a concentration of at least 0.5 percent and up to 2.0 percent by mass; the flour comprises calcium at a concentration of at least 250 parts per million by mass; the flour comprises iron at a concentration of at least 40 parts per million by mass; the flour comprises copper at a concentration of at least 1 part per million by mass; the flour comprises zinc at a concentration of at least 50 parts per million by mass; the flour comprises phosphorous at a concentration of at least 0.6 percent by mass; and the flour comprises cholesterol at a concentration of up to 0.5 percent by mass. In some specific examples, the ground meat powder consists of beef; the flour comprises fat at a concentration of at least 5 percent and up to 25 percent by mass; the flour comprises saturated fat at a concentration of at least 1 percent and up to 3 percent by mass; the flour comprises protein at a concentration of at least 30 percent and up to 60 percent by mass; the flour comprises at least 2.5 and up to 5.5 food calories per gram; the flour comprises potassium at a concentration of at least 0.9 percent and up to 2.0 percent by mass; the flour comprises calcium at a concentration of at least 250 parts per million and up to 500 parts per million by mass; the flour comprises iron at a concentration of at least 40 parts per million and up to 120 parts per million by mass; the flour comprises copper at a concentration of at least 1 part per million and up to 4 parts per million by mass; the flour comprises zinc at a concentration of at least 100 parts per million and up to 150 parts per million by mass; the flour comprises phosphorous at a concentration of at least 0.6 percent and up to 0.9 percent by mass; and the flour comprises cholesterol at a concentration of up to 0.4 percent by mass.

In some examples, the ground meat powder comprises one, two, or each of heart, liver, and kidney; the flour comprises iron at a concentration of at least 50 parts per million by mass; and the flour comprises copper at a concentration of at least 10 parts per million by mass. In some specific examples, the ground meat powder consists of beef; the flour comprises fat at a concentration of at least 5 percent and up to 25 percent by mass; the ground meat powder comprises one, two, or each of heart, liver, and kidney; the flour comprises saturated fat at a concentration of at least 1 percent and up to 3 percent by mass; the flour comprises protein at a concentration of at least 30 percent and up to 60 percent by mass; the flour comprises at least 2.5 and up to 5.5 food calories per gram; the flour comprises potassium at a concentration of at least 0.5 percent and up to 2.0 percent by mass; the flour comprises calcium at a concentration of at least 250 parts per million by mass; the flour comprises iron at a concentration of at least 40 parts per million by mass; the flour comprises copper at a concentration of at least 1 part per million by mass; the flour comprises zinc at a concentration of at least 50 parts per million by mass; the flour comprises phosphorous at a concentration of at least 0.6 percent by mass; the flour comprises cholesterol at a concentration of up to 0.5 percent by mass; the flour comprises iron at a concentration of at least 50 parts per million by mass; and the flour comprises copper at a concentration of at least 10 parts per million by mass. In some specific examples, the ground meat powder comprises one, two, or each of beef heart, beef liver, and beef kidney; the flour comprises iron at a concentration of at least 100 parts per million and up to 200 parts per million by mass; and the flour comprises copper at a concentration of at least 25 parts per million and up to 80 parts per million by mass.

In some examples, the ground meat powder consists of chicken; the flour comprises fat at a concentration of at least 2 percent and up to 15 percent by mass; the flour comprises protein at a concentration of at least 35 percent and up to 70 percent by mass; the flour comprises at least 2 and up to 6 food calories per gram; and the flour comprises cholesterol at a concentration of up to 0.5 percent by mass. In some specific examples, the ground meat powder consists of chicken; the flour comprises fat at a concentration of at least 2 percent and up to 15 percent by mass; the flour comprises saturated fat at a concentration of 0 percent and up to 2 percent by mass; the flour comprises protein at a concentration of at least 35 percent and up to 70 percent by mass; the flour comprises carbohydrates at a concentration of 0 percent and up to 2 percent by mass; the flour comprises at least 2 and up to 6 food calories per gram; the flour comprises potassium at a concentration of at least 0.5 percent and up to 2.0 percent by mass; the flour comprises iron at a concentration of at least 20 parts per million by mass; the flour comprises zinc at a concentration of at least 10 parts per million by mass; the flour comprises phosphorous at a concentration of at least 0.6 percent by mass; and the flour comprises cholesterol at a concentration of 0 parts per million and up to 0.4 percent by mass. In some specific examples, the ground meat powder consists of chicken; the flour comprises fat at a concentration of at least 2 percent and up to 15 percent by mass; the flour lacks saturated fat at a concentration greater than 2 percent by mass; the flour comprises protein at a concentration of at least 35 percent and up to 65 percent by mass; the flour lacks carbohydrates at a concentration greater than 2 percent by mass; the flour comprises at least 2.5 and up to 5.5 food calories per gram; the flour comprises potassium at a concentration of at least 0.9 percent and up to 2.0 percent by mass; the flour comprises iron at a concentration of at least 20 parts per million and up to 80 parts per million by mass; the flour comprises zinc at a concentration of at least 10 parts per million and up to 50 parts per million by mass; the flour comprises phosphorous at a concentration of at least 0.7 percent and up to 1.0 percent by mass; and the flour lacks cholesterol at a concentration greater than 0.4 percent by mass.

Various aspects of this disclosure relate to a food made using the flour described anywhere in this disclosure. The flours of this disclosure may be used to manufacture a variety of different baked goods including breads, bagels, tortillas, pastas, dumplings, crackers, and the like.

Various aspects of this disclosure relate to a method to prepare a food product, comprising providing a flour as described anywhere else in this disclosure; combining the flour with one or more additional ingredients to prepare a batter; and cooking the batter to produce the food product. Food products may be prepared, for example, by substituting all or part of a conventional flour of a recipe with and equal amount of a flour of this disclosure.

Various aspects of this disclosure relate to a method to prepare a flour, comprising providing a lean meat that has a water activity of less than 0.65 at 70 degrees Fahrenheit (21 degrees Celsius) and that comprises fat at a concentration of up to 25 percent; grinding the lean meat into bulk particles such that at least 50 percent of the bulk particles by mass have a particle size of at least 10 microns and up to 1,000 microns; packaging a portion of the bulk particles in a container; and hermetically sealing the container to produce a hermetically-sealed container that comprises the portion of the bulk particles. The method of grinding is not limiting as long as the grinding is capable of producing particles that fall within a desirable range of particle sizes such as at least 10 microns and up to 1,000 microns. In some examples, the grinding is performed in a blender.

Hermetically-sealed containers are depicted, for example, in FIG. 1-6. The term "hermetically-sealed" refers to a seal that inhibits gases from entering and leaving a container. Hermetically-sealed containers extend shelf life, for example, by inhibiting oxygen from entering a container and oxidizing flour that is hermetically-sealed within a container and/or by inhibiting microorganisms such as bacteria and molds from entering a container and thereby disrupting the sterility of flour within the container.

A container of this disclosure may be configured for retail sale and contain, for example, at least 100 grams and up to 1,100 grams of a flour of this disclosure.

In some examples, the method comprises sorting the bulk particles by size after the grinding and prior to the packaging to separate finely-ground particles from larger particles, wherein the larger particles have a larger particle size than the finely-ground particles; and apportioning the portion of bulk particles from the finely-ground particles such that the portion of bulk particles has a greater surface-area-to-volume ratio than the bulk particles. Sorting the bulk particles by size may comprise, for example, screening the bulk particles with a mesh such as a strainer to separate finely-ground particles, which pass through the mesh, from larger particles, which are retained by the mesh.

In some examples, the method comprises measuring a final water activity of the portion of the bulk particles or the finely-ground particles after the grinding and before the sealing, wherein the method is performed such that the final water activity is no greater than 0.65 at 70 degrees Fahrenheit (21 degrees Celsius). In some specific examples, the method is performed such that the final water activity is at least 0.35 and up to 0.6 at 70 degrees Fahrenheit (21 degrees Celsius).

In some examples, providing the lean meat comprises dehydrating the lean meat.

In some examples, the method comprises dehydrating the lean meat in a dehydrator and maintaining a wet bulb temperature of at least 125 degrees Fahrenheit (52 degrees Celsius) in the dehydrator for a period of time. In some specific examples, the method comprises dehydrating the lean meat in a dehydrator and maintaining a wet bulb temperature of at least 125 degrees Fahrenheit (52 degrees Celsius) in the dehydrator for at least an hour.

In some examples, the method comprises dehydrating the lean meat in a dehydrator and maintaining a relative humidity of at least 27.1 percent in the dehydrator for a period of time. In some specific examples, the method comprises dehydrating the lean meat in a dehydrator and maintaining a relative humidity of at least 27.1 percent in the dehydrator for at least an hour.

In some examples, the method comprises dehydrating the lean meat in a dehydrator and maintaining a relative humidity of at least 27.1 percent and a wet bulb temperature of at least 125 degrees Fahrenheit (52 degrees Celsius) in the dehydrator for a period of time. In some specific examples, the method comprises dehydrating the lean meat in a dehydrator and maintaining a relative humidity of at least 27.1 percent and a wet bulb temperature of at least 125 degrees Fahrenheit (52 degrees Celsius) in the dehydrator for at least one hour.

In some examples, the method comprises dehydrating the lean meat to a water activity of no greater than 0.25.

In some examples, the method comprises soaking the lean meat in salt water prior to the dehydrating. In some specific examples, the method comprises soaking the lean meat in salt water prior to the dehydrating, wherein the salt water comprises at least 500 parts per million and up to 28 percent by mass dissolved sodium chloride. In some specific examples, the method comprises soaking the lean meat in salt water prior to the dehydrating, wherein the salt water comprises at least 2 percent and up to 28 percent by mass dissolved sodium chloride.

In some examples, the method comprises manufacturing a flour as described anywhere in this disclosure from either the bulk particles or the portion of the bulk particles.

In some examples, the method comprises selling the hermetically-sealed container that comprises the portion of the bulk particles.

Various aspects of this disclosure relate to a ground meat powder produced according to any of the methods set forth in this disclosure.

Various aspects of this disclosure relate to a flour produced according to any of the methods set forth in this disclosure.

Various aspects of this disclosure relate to a baked good produced from a flour of this disclosure.

EXAMPLES

The following examples describe exemplary methods and compositions of this disclosure, and the examples do not limit the foregoing detailed description, the appended claims, or any patent claim that matures from this disclosure.

Example 1. Method to Produce Lean, Dehydrated Meat

Figure 7:
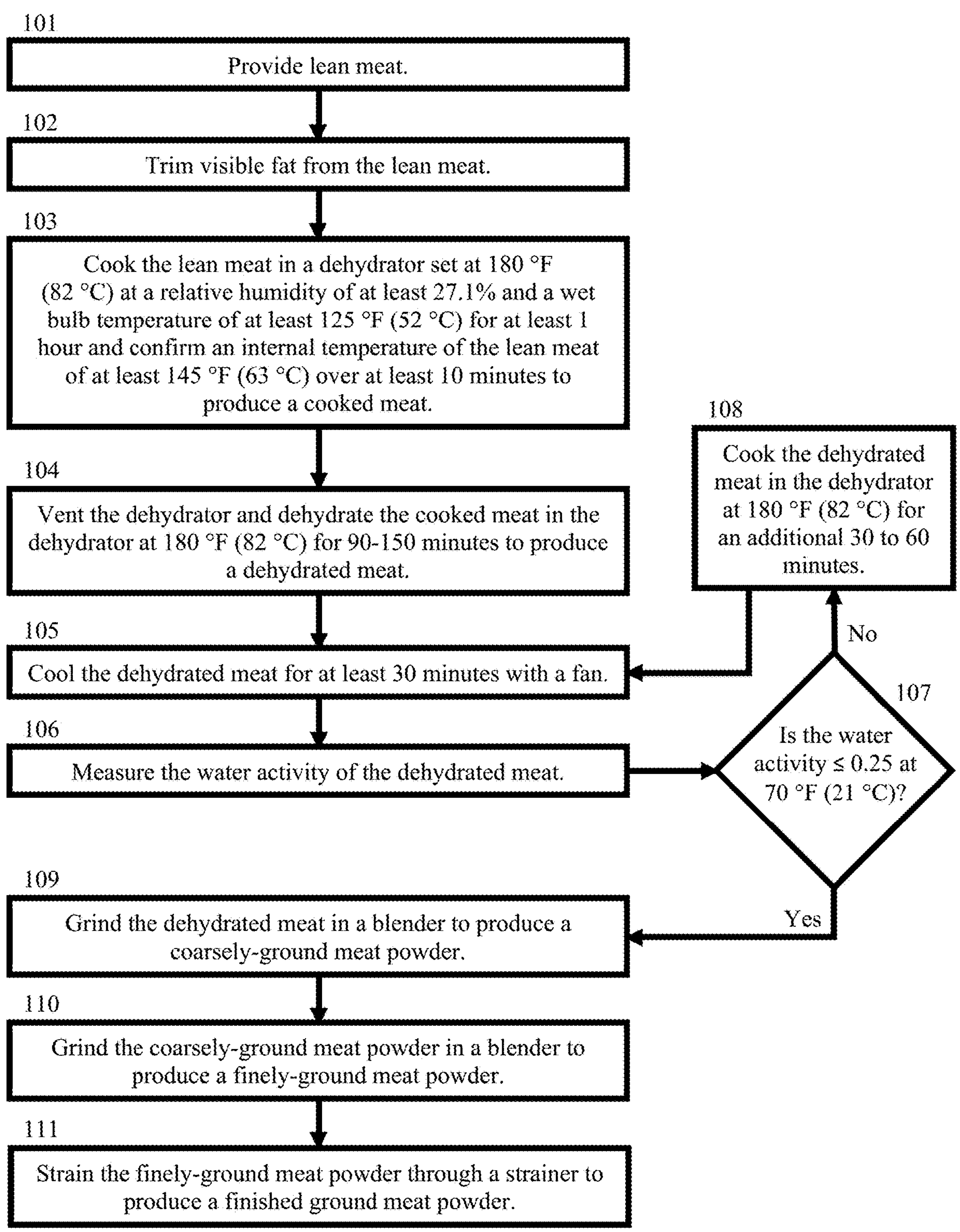
FIG. 7 is a flowchart that depicts an illustrative method of manufacturing a ground meat powder of this disclosure.

FIG. 7 provides a flowchart to produce a ground meat powder, which is referenced in this example. Lean meat is provided at 101, and visible fat is trimmed from the meat at 102. Illustrative meats include lean cuts of beef, beef heart, beef kidney, beef liver, and chicken breast. A dehydrator is set at 180 degrees Fahrenheit (82 degrees Celsius) and preheated for at least 3 to 5 minutes. A tray of lean, trimmed meat is inserted into the dehydrator. A thermometer is inserted into a piece of meat, and a wet bulb thermometer is placed in the dehydrator.

The meat is cooked in the dehydrator for 20 minutes, and the humidity, ambient temperature inside the dehydrator, and wet bulb temperature are recorded at the end of 20 minutes. The relative humidity is at least 27.1 percent, and wet bulb temperature is at least 125 degrees Fahrenheit (52 degrees Celsius) at the end of 20 minutes. If the relative humidity is less than 27.1 percent and/or the wet bulb temperature is less than 125 degrees Fahrenheit (52 degrees Celsius), then the relative humidity and wet bulb temperature are monitored periodically until they reach or exceed the foregoing thresholds.

The meat continues to cook in the dehydrator for an additional 60 minutes 103, and the humidity, ambient temperature inside the dehydrator, the wet bulb temperature, and the internal temperature of the meat are recorded at the end of the additional 60 minutes. At the end of the additional 60 minutes, the relative humidity is at least 27.1 percent and the wet bulb temperature is at least 125 degrees Fahrenheit (52 degrees Celsius) such that the meat was exposed to a relative humidity of at least 27.1 percent and a wet bulb temperature of at least 125 degrees Fahrenheit (52 degrees Celsius) for at least 60 minutes at 103. At the end of the additional 60 minutes, the internal temperature of the meat is at least 145 degrees Fahrenheit (63 degrees Celsius). If the internal temperature of the meat is less than 145 degrees Fahrenheit (63 degrees Celsius), then the internal temperature is monitored periodically until it reaches or exceeds the foregoing threshold. At this timepoint, the meat has been in the dehydrator for at least 1 hour and 20 minutes.

The meat continues to cook in the dehydrator for an additional 10 minutes, and the humidity, ambient temperature inside the dehydrator, the wet bulb temperature, and the internal temperature of the meat are recorded at the end of the additional 10 minutes. At the end of the additional 10 minutes, the relative humidity is at least 27.1 percent and the wet bulb temperature is at least 125 degrees Fahrenheit (52 degrees Celsius). At the end of the additional 10 minutes, the internal temperature of the meat is at least 145 degrees Fahrenheit (63 degrees Celsius) at 103. At this timepoint, the meat has been in the dehydrator for at least 1 hour and 30 minutes.

The vent of the dehydrator is then opened at 104 to reduce the relative humidity and the meat is rotated in the dehydrator.

The meat continues to cook in the dehydrator for an additional 30 minutes, and the internal temperature of the meat is recorded at the end of the additional 30 minutes. At this timepoint, the meat has been in the dehydrator for at least 2 hours.

The meat continues to cook in the dehydrator for an additional 60 minutes, and the internal temperature of the meat is recorded at the end of the additional 60 minutes. The meat is rotated in the dehydrator. At this timepoint, the meat has been in the dehydrator for at least 3 hours.

The meat optionally continues to cook for an additional 60 minutes, and the internal temperature of the meat is recorded at the end of the additional 60 minutes. At this timepoint, the meat has been in the dehydrator for at least 4 hours.

The meat is then removed from the dehydrator and cooled by fans for at least 30 minutes at 105. The water activity of the meat is measured at 106 and determined to be no greater than 0.25 at a temperature of 70 degrees Fahrenheit (21 degrees Celsius) at 107. If the water activity is greater than 0.25, then the meat is placed back into the dehydrator at 180 degrees Fahrenheit (82 degrees Celsius) for an additional 30 to 60 minutes at 108 and then re-cooled by fans for at least another 30 minutes at 105 until the water activity is measured at 106 and determined to be no greater than 0.25 at 70 degrees Fahrenheit (21 degrees Celsius) at 107.

Example 2. Method to Produce Ground Meat Powder from Lean, Dehydrated Meat

The lean, dehydrated meat of Example 1 is inserted into a Robot-Coupe® blender (Robot-Coupe, France) and ground first to break the meat into smaller pieces at 109 and then ground a second time to produce a fine powder at 110. The powder is then strained to separate the fine powder from larger grind sizes at 111. Larger grind sizes are reground in the blender until they pass through the strainer. The water activity of the strained, fine powder is measured and determined to be no greater than 0.65 at 70 degrees Fahrenheit (21 degrees Celsius). The fine powder is optionally combined with one or more additional ingredients such as sodium chloride (for example, Redmond Real Salt®, Redmond Life, Utah, United States) and then packaged as a flour as described in the foregoing detailed description.

Example 3. Water Activity Measurements of Flours

Various flours were prepared according to the preceding Examples 1 and 2 including beef flour and chicken flour, and their water activities are recorded in Table 1 below. Beef flour optionally included organ meats as indicated in Table 1.

TABLE 1

Water Activity of Flours

| Meat Type | Water Activity at 70 degrees Fahrenheit (21 degrees Celsius) |
|---|---|
| Beef (including heart, kidney, and liver) | 0.4735 |
| Beef | 0.4265 |
| Chicken | 0.5837 |
| Beef | 0.4941 |
| Chicken | 0.5708 |
| Beef (including heart, kidney, and liver) | 0.5093 |
| Chicken | 0.5877 |

Example 4. Measured Characteristics of Flours

Various flours were prepared according to preceding Examples 1 and 2 including beef flour and chicken flour, and various characteristics of the flours were measured by Michelson Laboratories, Inc. (California, United States). The measurements are set forth in Table 2 below, in which all measurements are by mass. Concentrations of various minerals are enriched relative to unprocessed meats. The flours therefore provide enhanced nutritional value per gram relative to conventional meat. The flours also provide enhanced nutritional value per gram relative to conventional flours.

"20 Mesh" refers to the percent by mass of flour particles that were retained by a size 20 mesh and therefore have at least one dimension greater than about 850 microns. "200 Mesh" refers to the percent by mass of flour particles that were retained by a size 200 mesh and therefore have at least one dimension greater than about 75 microns. "Delta 20-200 Mesh" refers to the percent by mass of flour particles that passed through a size 20 mesh and that were retained by a size 200 mesh, and which therefore generally include at least one dimension greater than about 75 microns and also generally lack any dimension greater than about 850 microns.

The term "about" denotes the imprecision in relating mesh size to particle size, which is beyond the scope of this disclosure.

TABLE 2

Measured Characteristics of Flours

| | Beef Flour | Chicken Flour | Beef Flour (including heart, kidney, and liver) |
|---|---|---|---|
| Fat | 11.1 percent | 6.22 percent | 15.4 percent |
| Calcium | 377 ppm | 261 ppm | 310 ppm |
| Iron | 60 ppm | 31 ppm | 147 ppm |
| Potassium | 1.2 percent | 1.3 percent | 1.1 percent |
| Magnesium | 819 ppm | 991 ppm | 741 ppm |
| Copper | 1.8 ppm | 1.1 ppm | 43 ppm |
| Iron | 60 ppm | 31 ppm | 147 ppm |
| Zinc | 128 ppm | 23 ppm | 136 ppm |
| Phosphorous | 0.71 percent | 0.83 percent | 0.71 percent |
| 20 Mesh | 40.9 percent | 0.9 percent | 33.5 percent |
| 200 Mesh | 99.0 percent | 91.1 percent | 99.8 percent |
| Delta 20-200 Mesh | 59.0 percent | 90.2 percent | 66.3 percent |

Example 5. Typical Characteristics of Flours

Various flours were prepared according to the preceding Examples 1 and 2 including beef flour and chicken flour, and the flours were packaged for retail sale. Images of the flours are depicted in FIGS. 1-3, images of the product packaging are depicted in FIGS. 1-6, and images of United States Nutrition Facts labels are depicted in FIGS. 8-10. The Nutrition Facts labels vary from the measurements reported in Example 4, for example, because the measurements do not account for variability. Various characteristics of the flours as reported on the Nutrition Facts labels are reported in Table 3 below.

TABLE 3

Typical Characteristics of Flours

| | Beef Flour | Chicken Flour | Beef Flour (including heart, kidney, and liver) |
|---|---|---|---|
| Calories per gram | 3.3 | 3.3 | 3.8 |
| Fat | 16.7 percent | 7.1 percent | 19.1 percent |
| Saturated Fat | 2.1 percent | 0 percent | 1.9 percent |
| Cholesterol | 0.14 percent | 0.19 percent | 0.36 percent |
| Sodium | 0.86 percent | 0.86 percent | 0.76 percent |
| Carbohydrates | 0 percent | 0 percent | 0 percent |
| Protein | 43 percent | 57 percent | 43 percent |
| Calcium | 476 ppm | N/A | 476 ppm |
| Iron | 62 pm | 33 ppm | 90 ppm |
| Potassium | 0.67 percent | 0.86 percent | 0.67 percent |

Example 6. Some Typical Characteristics of Ground Meat Powders

Tables 2 and 3 above do not account for variability, and the following Table 4 sets forth characteristic ranges of ground meat powders. Flours that comprise ground meat powders according to Table 4 may nevertheless comprise concentrations that vary from one or more ranges set forth in Table 4 based upon the relative concentration(s) of ground meat powder(s) in the flour and the composition(s) of any additional ingredient(s) in the flours. Dilution of a ground meat powder with an additional ingredient might cause a flour to include one or more components set forth in Table 4 at a concentration that falls below one or more ranges set forth in Table 4. A flour might be enriched, for example, with one or more minerals selected from calcium, potassium, sodium, magnesium, copper, iron, zinc, and phosphorous, which might cause one or more concentrations of the minerals to exceed one or more ranges set forth in Table 4. A flour might also be enriched, for example, with protein, such as by adding a protein isolate to the flour, which might cause a concentration of protein in beef flour or chicken flour to exceed the ranges set forth in Table 4. A flour might include an ingredient that comprises carbohydrates, such as a conventional cereal flour, which might cause a concentration of carbohydrates to exceed the ranges set forth in Table 4.

TABLE 4

| Compositions of Ground Meat Powders | | | | |
|---|---|---|---|---|
| | Generic Flour | Beef Flour | Chicken Flour | Beef Flour (including heart, kidney, and liver) |
| Fat | 1 to 25 percent | 5 to 25 percent | 2 to 15 percent | 5 to 25 percent |
| Saturated Fat | 0 to 3 percent | 1 to 3 percent | 0 to 1 percent | 1 to 3 percent |
| Cholesterol | 0 to 0.5 percent | 0 to 0.4 percent | 0 to 0.4 percent | 0.2 to 0.5 percent |
| Carbohydrates | 0 to 2 percent | 0 to 2 percent | 0 to 2 percent | 0 to 2 percent |
| Protein | 30 to 95 percent | 30 to 60 percent | 35 to 65 percent | 30 to 60 percent |
| Calories per gram | 2 to 6 | 2.5 to 5.5 | 2.5 to 5.5 | 2.5 to 5.5 |
| Calcium | 200 to 500 ppm | 250 to 500 ppm | 200 to 450 ppm | 250 to 500 ppm |
| Potassium | 0.9 to 2 percent | 0.9 to 2 percent | 0.9 to 2 percent | 0.9 to 2 percent |
| Sodium | 0.1 to 2 percent | 0.1 to 2 percent | 0.1 to 2 percent | 0.1 to 2 percent |
| Magnesium | 600 to 1200 ppm | 700 to 1100 ppm | 800 to 1200 ppm | 600 to 1000 ppm |
| Copper | 0.8 to 80 ppm | 1 to 4 ppm | 0.8 to 2 ppm | 25 to 80 ppm |
| Iron | 20 to 200 ppm | 40 to 120 ppm | 20 to 80 ppm | 50 to 200 ppm |
| Zinc | 10 to 180 ppm | 100 to 150 ppm | 10 to 50 ppm | 100 to 180 ppm |
| Phosphorous | 0.6 to 1.0 percent | 0.6 to 0.9 percent | 0.7 to 1.0 percent | 0.6 to 0.9 percent |
| Water Activity at 72° F. (21° C.) | 0.35 to 0.6 | 0.35 to 0.6 | 0.35 to 0.6 | 0.35 to 0.6 |
| 20 Mesh | 0 to 50 percent | 10 to 50 percent | 0 to 40 percent | 5 to 45 percent |
| 200 Mesh | 80 to 100 percent | 80 to 100 percent | 80 to 100 percent | 80 to 100 percent |
| Delta 20-200 Mesh | 50 to 100 percent | 50 to 100 percent | 50 to 100 percent | 50 to 100 percent |

Example 7. Recipe to Make Bread

Figure 11:
FIG. 11 is an image of a sandwich made from bread, in which a flour according to this disclosure is the only source of flour in the bread.

One egg, 21 grams of Carnivore Crisps flour (as depicted in any one of FIGS. 1-9), a tablespoon of melted butter, half a teaspoon of baking powder, and a few drops of sourdough bread flavoring are combined with a whisk to produce a batter. A microwave safe container is greased, and the batter is microwaved on high in a conventional microwave for 60 to 90 seconds. After a few minutes of cooling, the bread is ready to eat. An image of a sandwich made from toasted bread according to this example is depicted in FIG. 11.

Example 8. Recipe to Make Muffins

Figure 12:
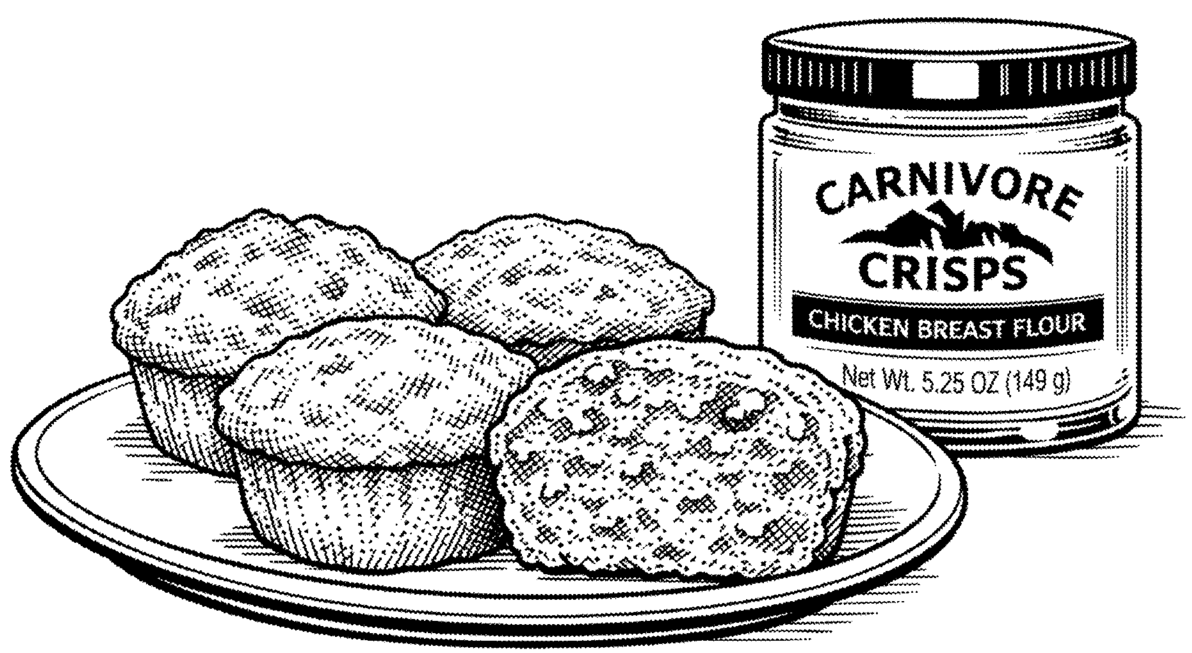
FIG. 12 is an image of muffins, in which a flour according to this disclosure is the only source of flour in the muffins.

Eight tablespoons of Carnivore Crisps flour (as depicted in any one of FIGS. 1-9), half a teaspoon of baking powder, two teaspoons of oil or butter, two eggs, and optionally bacon crumbles are combined in a bowl to produce a batter. The batter is poured into two muffin forms of a greased muffin pan and baked in an oven at 375 degrees Fahrenheit (191 degrees Celsius) for twenty minutes. This recipe makes two muffins, and an image of muffins according to this example is depicted in FIG. 12.

Example 9. Recipe to Make Bagels

Figure 13:
FIG. 13 is an image of bagels, in which a flour according to this disclosure is the only source of flour in the bagels.

Eight medium eggs, two ounces of melted butter, four ounces of shredded cheddar cheese, four ounces of whole milk cottage cheese, one ounce of Carnivore Crisps beef flour (as depicted in any one of FIGS. 1, 4, and 8), one ounce of Carnivore Crisps chicken flour (as depicted in any one of FIGS. 2, 5, and 9), five grams of baking powder, and optionally half of an jalapeño pepper are blended in a blender until smooth to produce a batter. The batter is poured into ten doughnut forms of a greased doughnut pan and baked in an oven at 375 degrees Fahrenheit (191 degrees Celsius) for 22 minutes. This recipe makes ten bagels, and an image of bagels according to this example is depicted in FIG. 13.

Example 10. Recipe to Make Brownies

Figure 14:
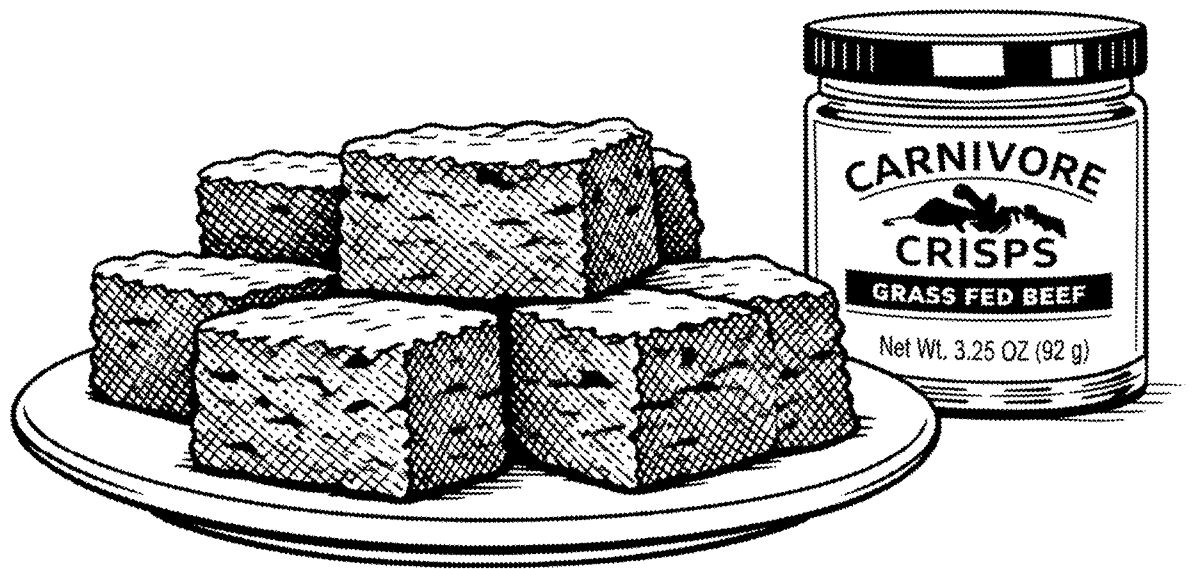
FIG. 14 is an image of brownies, in which a flour according to this disclosure is the only source of flour in the brownies.

Half a cup of butter is melted in a pan on medium heat. The pan is then removed from the heat, and a quarter cup of sugar-free chocolate chips and one cup of allulose or other sweetener is combined into the butter. Half a teaspoon of vanilla extract is added into the mixture followed by two large eggs that are combined one at a time. A third of a cup of cocoa powder, half a cup of Carnivore Crisps beef flour (as depicted in any one of FIGS. 1, 4, and 8), a quarter teaspoon of salt, and a quarter teaspoon of baking powder are then gently stirred into the mixture to produce a batter. The batter is poured into a greased pan and baked for thirty minutes at 350 degrees Fahrenheit (177 degrees Celsius). An image of brownies according to this example is depicted in FIG. 14.

What is claimed is:

1. A flour that is a dry, solid powder, the flour comprising:

a ground meat powder at a concentration of at least 70 percent by mass, wherein at least 50 percent of the powder by mass has a particle size of at least 75 microns and up to 850 microns;

fat at a concentration of up to 15 percent by mass;

protein at a concentration of at least 30 percent and up to 95 percent by mass;

at least 2 and up to 6 food calories per gram;

potassium at a concentration of at least 0.5 percent and up to 2.5 percent by mass;

phosphorous at a concentration of at least 0.6 percent and up to 1.2 percent by mass; and a water activity of at least 0.35 and up to 0.6 at 70 degrees Fahrenheit, wherein the powder has a surface-area-to-volume ratio of at least 800 per meter and up to 110,000 per meter.

2. A flour that is a dry, solid powder, the flour comprising:

a ground meat powder at a concentration of at least 70 percent by mass, wherein at least 50 percent of the powder by mass has a particle size of at least 10 microns and up to 1,000 microns;

fat at a concentration of up to 15 percent by mass;

protein at a concentration of at least 30 percent and up to 95 percent by mass;

at least 2 and up to 6 food calories per gram; and a water activity of up to 0.6 at 70 degrees Fahrenheit, wherein the powder has a surface-area-to-volume ratio of at least 800 per meter and up to 110,000 per meter.

3. The flour of claim 1 or 2, wherein:

the ground meat powder consists of beef;

the flour comprises fat at a concentration of at least 1 percent and up to 15 percent by mass;

the flour comprises protein at a concentration of at least 30 percent and up to 60 percent by mass;

the flour comprises at least 2 and up to 6 food calories per gram; and the flour comprises cholesterol at a concentration of up to 0.5 percent by mass.

4. The flour of claim 1 or 2, wherein:

the ground meat powder consists of beef;

the flour comprises fat at a concentration of at least 1 percent and up to 15 percent by mass;

the flour comprises saturated fat at a concentration of at least 1 percent and up to 3 percent by mass;

the flour comprises protein at a concentration of at least 30 percent and up to 60 percent by mass;

the flour comprises at least 2.5 and up to 5.5 food calories per gram;

the flour comprises potassium at a concentration of at least 0.5 percent and up to 2.0 percent by mass;

the flour comprises calcium at a concentration of at least 250 parts per million by mass;

the flour comprises iron at a concentration of at least 40 parts per million by mass;

the flour comprises copper at a concentration of at least 1 part per million by mass;

the flour comprises zinc at a concentration of at least 50 parts per million by mass;

the flour comprises phosphorous at a concentration of at least 0.6 percent by mass; and the flour comprises cholesterol at a concentration of up to 0.5 percent by mass.

5. The flour of claim 1 or 2, wherein:

the ground meat powder comprises one, two, or each of heart, liver, and kidney;

the flour comprises iron at a concentration of at least 40 parts per million by mass; and the flour comprises copper at a concentration of at least 10 parts per million by mass.

6. The flour of claim 1 or 2, wherein:

the ground meat powder consists of chicken;

the flour comprises fat at a concentration of at least 2 percent and up to 15 percent by mass;

the flour comprises protein at a concentration of at least 35 percent and up to 70 percent by mass;

the flour comprises at least 2 and up to 6 food calories per gram; and the flour comprises cholesterol at a concentration of 0 percent and up to 0.5 percent by mass.

7. The flour of claim 1 or 2, wherein:

the ground meat powder consists of chicken;

the flour comprises fat at a concentration of at least 2 percent and up to 15 percent by mass;

the flour comprises saturated fat at a concentration of 0 percent and up to 2 percent by mass;

the flour comprises protein at a concentration of at least 35 percent and up to 70 percent by mass;

the flour comprises carbohydrates at a concentration of 0 percent and up to 2 percent by mass;

the flour comprises at least 2 and up to 6 food calories per gram;

the flour comprises potassium at a concentration of at least 0.5 percent and up to 2.0 percent by mass;

the flour comprises iron at a concentration of at least 20 parts per million by mass;

the flour comprises zinc at a concentration of at least 10 parts per million by mass;

the flour comprises phosphorous at a concentration of at least 0.6 percent by mass; and the flour comprises cholesterol at a concentration of 0 parts per million and up to 0.4 percent by mass.

8. The flour of claim 1 or 2, wherein the ground meat powder consists of one or more of fish, chicken, poultry, rabbit, pork, mutton, chevon, venison, veal, and beef.

9. The flour of claim 1 or 2, wherein the flour comprises carbohydrates at a concentration of 0 percent and up to 2 percent by mass.

10. A food made using the flour of claim 1 or 2.

* * * * *